United States Patent
Chang

(10) Patent No.: US 9,739,039 B2
(45) Date of Patent: Aug. 22, 2017

(54) FAUCET FOR SWITCHING BETWEEN MULTIPLE WATER SOURCES

(71) Applicant: Chia-Po Chang, Changhua (TW)

(72) Inventor: Chia-Po Chang, Changhua (TW)

(73) Assignee: Hain Yo Enterprises Co. Ltd., Changhua (TW)

( * ) Notice: Subject to any disclaimer, the term of this patent is extended or adjusted under 35 U.S.C. 154(b) by 0 days.

(21) Appl. No.: 14/952,998

(22) Filed: Nov. 26, 2015

(65) Prior Publication Data

US 2017/0152649 A1 Jun. 1, 2017

(51) Int. Cl.
| F16K 11/087 | (2006.01) |
| E03C 1/04 | (2006.01) |
| E03C 1/08 | (2006.01) |
| F16K 11/078 | (2006.01) |
| F16K 31/60 | (2006.01) |
| E03C 1/02 | (2006.01) |

(52) U.S. Cl.
CPC ............. *E03C 1/04* (2013.01); *E03C 1/08* (2013.01); *F16K 11/078* (2013.01); *F16K 31/60* (2013.01); *E03C 2001/026* (2013.01)

(58) Field of Classification Search
CPC .... E03C 2201/30; E03C 2201/40; E03C 1/04; C02F 1/003; Y10T 137/86815; Y10T 137/9464
USPC ........ 137/603, 605, 607, 625.4, 625.41, 801
See application file for complete search history.

(56) References Cited

U.S. PATENT DOCUMENTS

| | | | | | |
|---|---|---|---|---|---|
| 5,205,313 | A | * | 4/1993 | Moretti | F16K 35/14 137/112 |
| 5,293,901 | A | * | 3/1994 | Guzzini | E03C 1/04 137/595 |
| 5,324,434 | A | * | 6/1994 | Oikawa | C02F 1/46104 204/228.1 |
| 5,417,348 | A | * | 5/1995 | Perrin | B67D 1/0059 137/606 |
| 5,983,938 | A | * | 11/1999 | Bowers | C02F 1/003 137/625.17 |
| 6,029,699 | A | * | 2/2000 | Granot | E03C 1/04 137/565.12 |
| 6,518,720 | B1 | * | 2/2003 | Frantz | E05B 77/48 318/445 |
| 6,729,344 | B1 | * | 5/2004 | Hung | E03C 1/0404 137/339 |
| 2006/0266424 | A1 | * | 11/2006 | Filtness | E03C 1/0403 137/625.4 |

(Continued)

*Primary Examiner* — Reinaldo Sanchez-Medina
(74) *Attorney, Agent, or Firm* — Che-Yang Chen; Law Offices of Scott Warmuth

(57) ABSTRACT

A faucet for switching between multiple water sources may include a faucet body, a ceramic control valve, a filtered water source, and a water outlet tube. A water inlet chamber and a water outlet chamber are formed at a bottom portion and a top portion of the faucet body respectively. A valve channel formed at a lateral side of the faucet body is configured to provide loading for the ceramic control valve. A water outlet tube comprising an inner tube and an outer tube is formed inside of the water outlet chamber. By using the long grooving-shaped water channel penetrating the annular wall located at a cross section of the valve channel and the water outlet chamber, the faucet is able to provide plentiful multiple water sources from the outer tube of the water outlet tube.

5 Claims, 6 Drawing Sheets

(56) References Cited

U.S. PATENT DOCUMENTS

2007/0235091 A1* 10/2007 Granot .................. E03C 1/0404
          137/597
2012/0018020 A1* 1/2012 Moore .................. E03C 1/0403
          137/798

* cited by examiner

FAUCET FOR SWITCHING BETWEEN MULTIPLE WATER SOURCES

FIELD OF THE INVENTION

The present invention relates to a faucet for switching between multiple water sources and more particularly to a faucet to control the tap water and filtered water when installed a control valve inside.

BACKGROUND OF THE INVENTION

By rotating or moving up the handle of a faucet, the faucet with a control valve can control the open/close operation, the mixing ratio of cold water and hot water, or the amount of water flow.

However, the conventional faucet is disadvantageous because: (i) the control valve of the conventional faucet can only be used for one kind of flow. In other words, when a faucet has to provide two different kinds of flows (such as tap water and filtered water, and the tap water still need to comprise a mixing function for the cold and hot water), there is a need to install another control valve in the faucet. As a result, it increases the complexity of the structure of faucet; and (ii) it is inconvenient for a user to operate two control valves in the same time. Therefore, there remains a need for a new and improved design for a ceramic control valve to overcome the problems presented above.

SUMMARY OF THE INVENTION

The present invention provides a faucet for switching between multiple water sources, which comprises a faucet body, a ceramic control valve, a filtered water source, and a water outlet tube. A water inlet chamber and a water outlet chamber are formed at a bottom portion and a top portion of the faucet body respectively. A valve channel formed at a lateral side of the faucet body is configured to provide loading for the ceramic control valve. A top portion of the water inlet chamber has a first end of a cold water inlet tube and a first end of a hot water inlet tube to receive hot water source and cold water source respectively. A second end of the cold water inlet tube and a second end of the hot water inlet tube are respectively connected to two first ends of water conduits with an angle. Thus, the combination of the cold water inlet tube and the water conduit, and the combination of the hot water inlet tube and the water conduit are formed into L-shaped. Also, both second ends of the water conduits protrude a bottom portion of the valve channel respectively. A central bottom portion of the valve channel has a water outlet hole to connect to the water outlet chamber, and a through hole located beneath the water outlet hole penetrates the water inlet chamber of the faucet body. A long grooving-shape water channel located above the water outlet hole horizontally penetrates an annular wall of the water outlet chamber. Thus, cold water, hot water or mixing water with different ratios of cold water and hot water are able to flow through the water channel into the water outlet chamber.

Comparing with conventional faucet, the present invention is advantageous because: (i) by using the faucet body with the ceramic control valve, the present invention is able to provide the tap water and the filtered water, and further provides hot water, cold water, or different mixing ratios of warm waters without installing another ceramic control valve. Therefore, the design of the present invention simplifies the complexity in structure; (ii) it is convenient for a user to control the filtered water and the tap water with the different mixing ratios of hot water and cold water by using the faucet body with a single ceramic control valve; and (iii) by using the long grooving-shaped water channel penetrating the annular wall located at a cross section of the valve channel and the water outlet chamber, the amounts of cold water, hot water or mixing warm waters are able to flow into the water outlet chamber, leading to allowing the faucet to provide plentiful multiple water sources from the outer tube.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
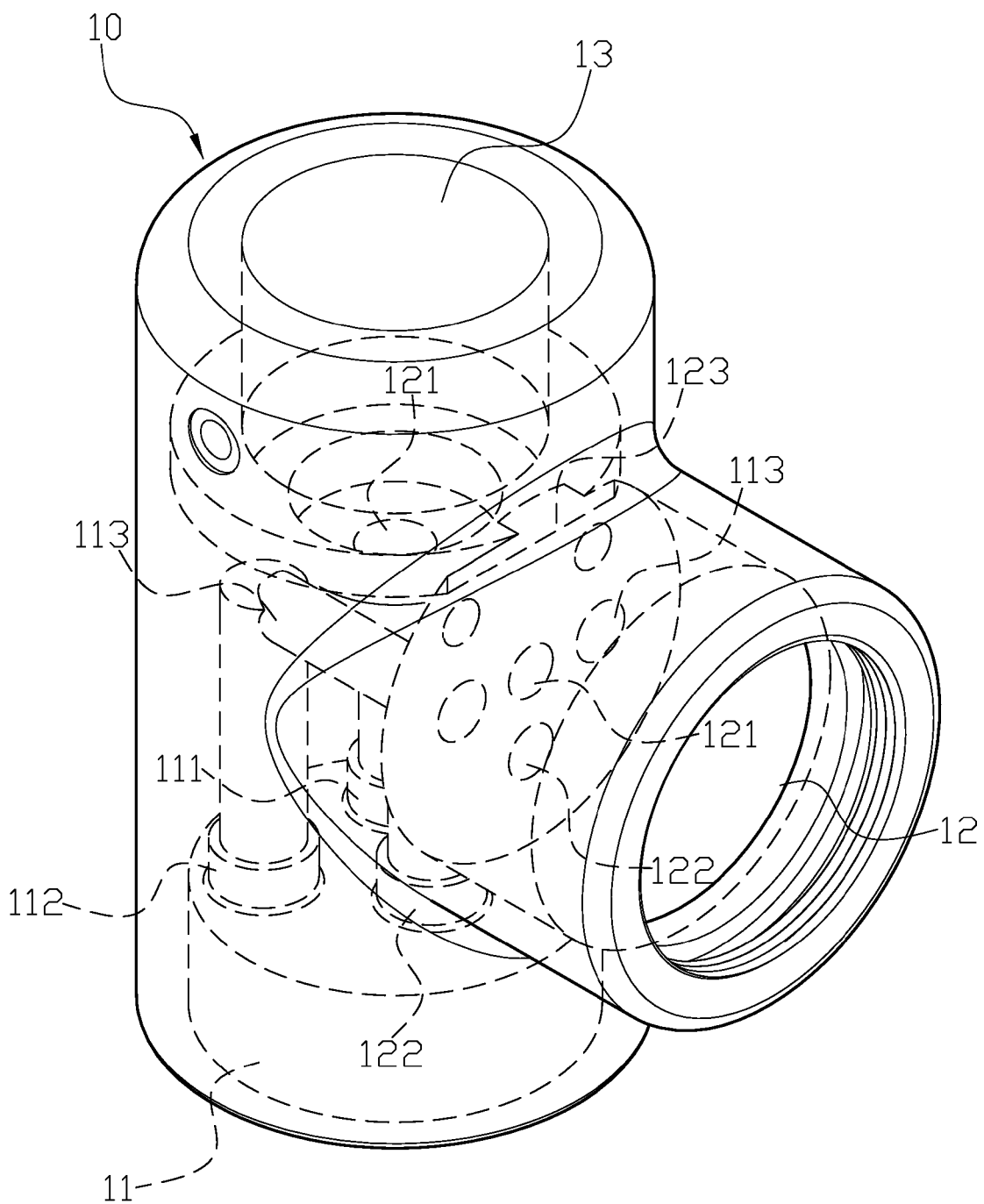
FIG. 1 is a three-dimensional view of the faucet of the present invention.
Figure 2:
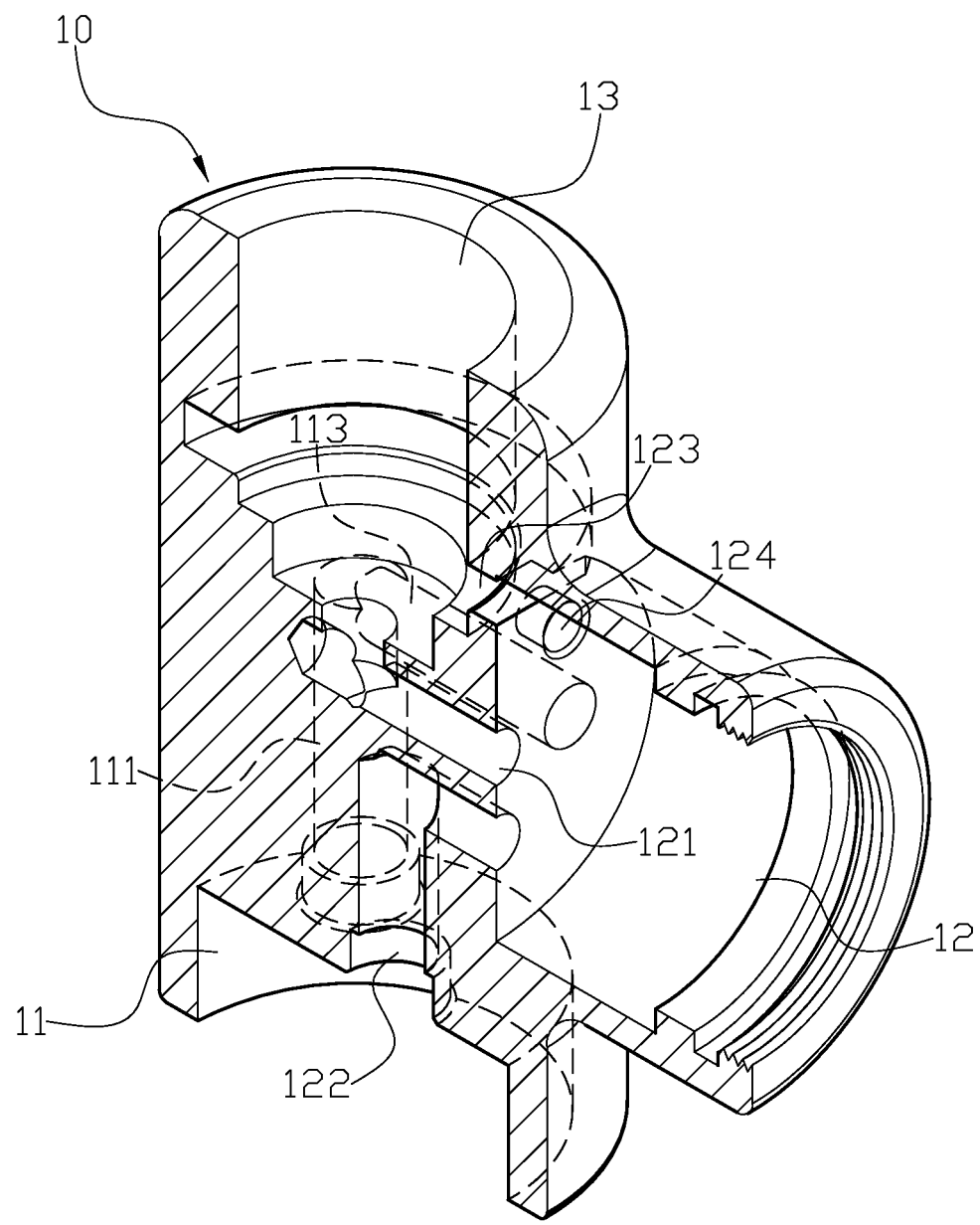
FIG. 2 is a three-dimensional, partial sectional view of the faucet of the present invention.
Figure 3:
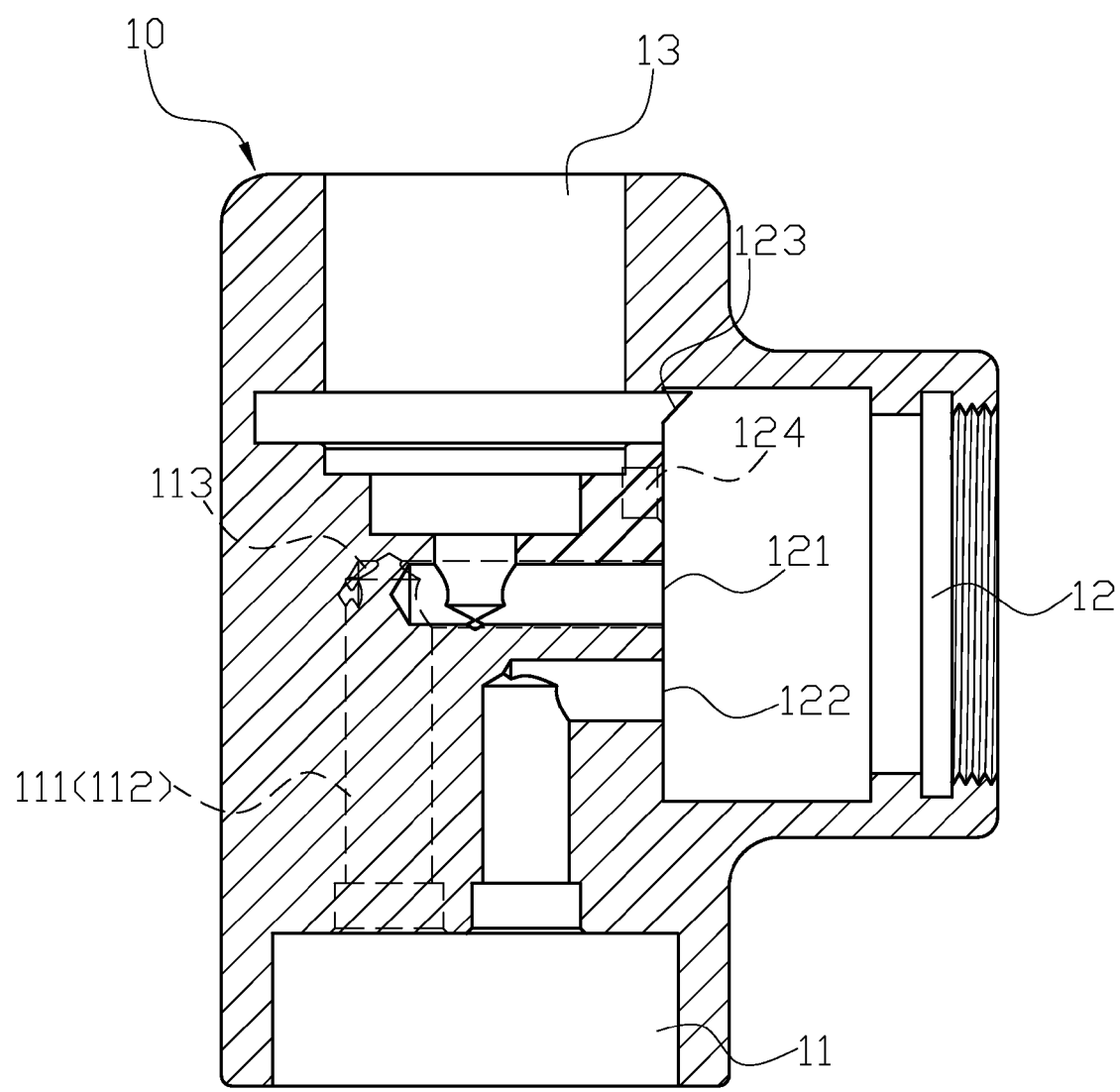
FIG. 3 is a sectional view of the faucet of the present invention.

In order to further understand the goal, characteristics and effect of the present invention, a number of embodiments along with the drawings are illustrated as following:

Referring to FIGS. 1 to 3, the present invention provides a faucet for switching between multiple water sources, which comprises a faucet body (10), a ceramic control valve (20), a filtered water source (30), and a water outlet tube (40). A water inlet chamber (11) and a water outlet chamber (13) are formed at a bottom portion and a top portion of the faucet body (10) respectively. A valve channel (12) formed at a lateral side of the faucet body (10) is configured to provide loading for the ceramic control valve (20). A top portion of the water inlet chamber (11) connected to a first end of a cold water inlet tube (111) and a first end of a hot water inlet tube (112) to receive hot water source and cold water source respectively. A second end of the cold water inlet tube (111) and a second end of the hot water inlet tube (112) are respectively connected to two first ends of water conduits (113) with an angle. Thus, the combination of the cold water inlet tube (111) and the water conduit (113), and the combination of the hot water inlet tube (112) and the water conduit (113) are formed into L-shaped. Also, both second ends of the water conduits (113) protrude a bottom portion of the valve channel (12) respectively. A central bottom portion of the valve channel (20) has a water outlet hole (121) to connect to the water outlet chamber (13), and a through hole (122) located beneath the water outlet hole (121) penetrates the water inlet chamber (11) of the faucet body (10). A long grooving-shape water channel (123) located above the water outlet hole (121) horizontally penetrates an annular wall of the water outlet chamber (13). Thus, cold water, hot water or mixing water with different ratios of cold water and hot water are able to flow through the water channel (123) into the water outlet chamber (13).

Figure 4:
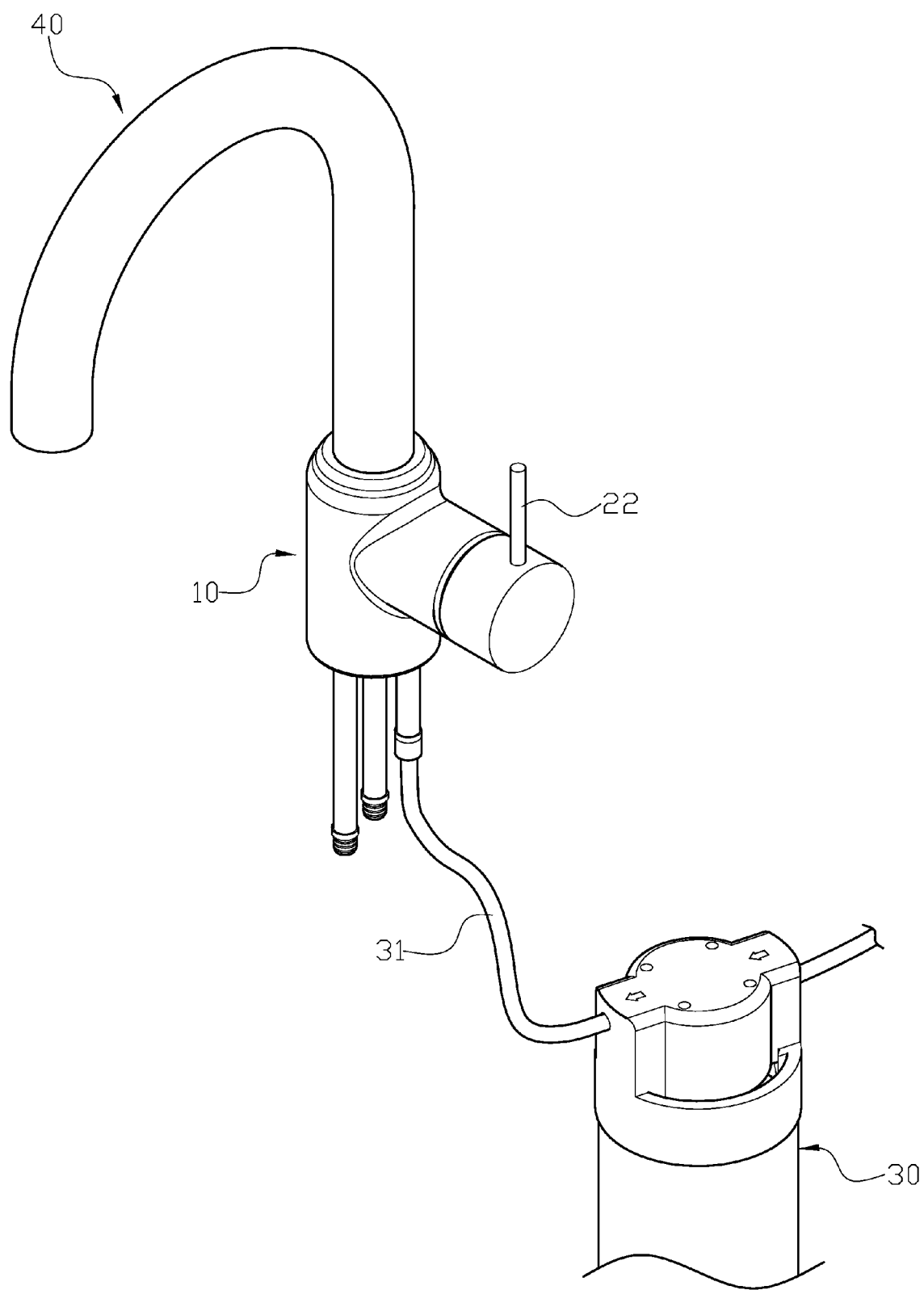
FIG. 4 is a schematic view of the faucet body connecting with the filtered water source in the present invention.
Figure 5:
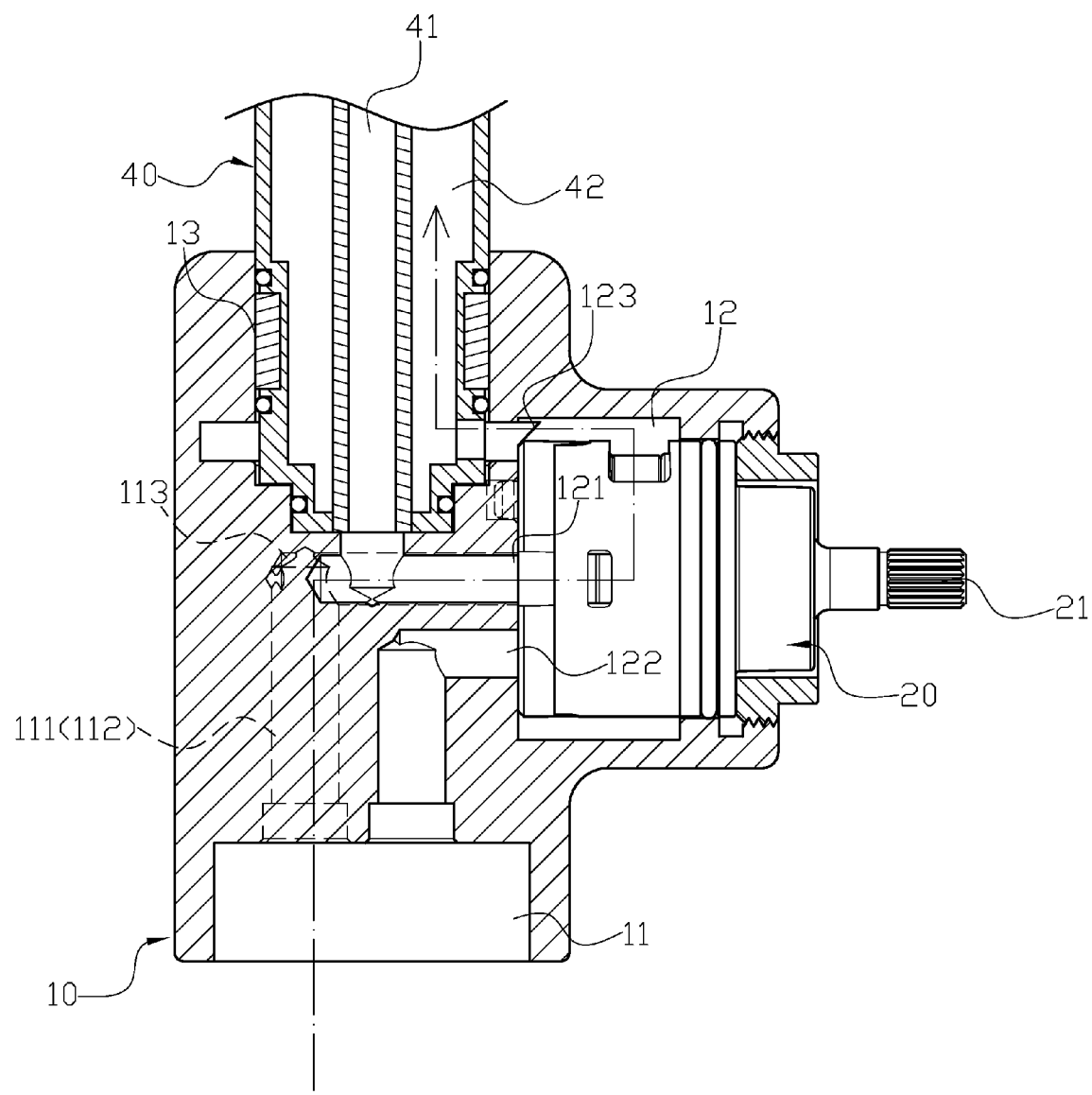
FIG. 5 is a schematic view of the faucet of the present invention providing cold water or hot water.
Figure 6:
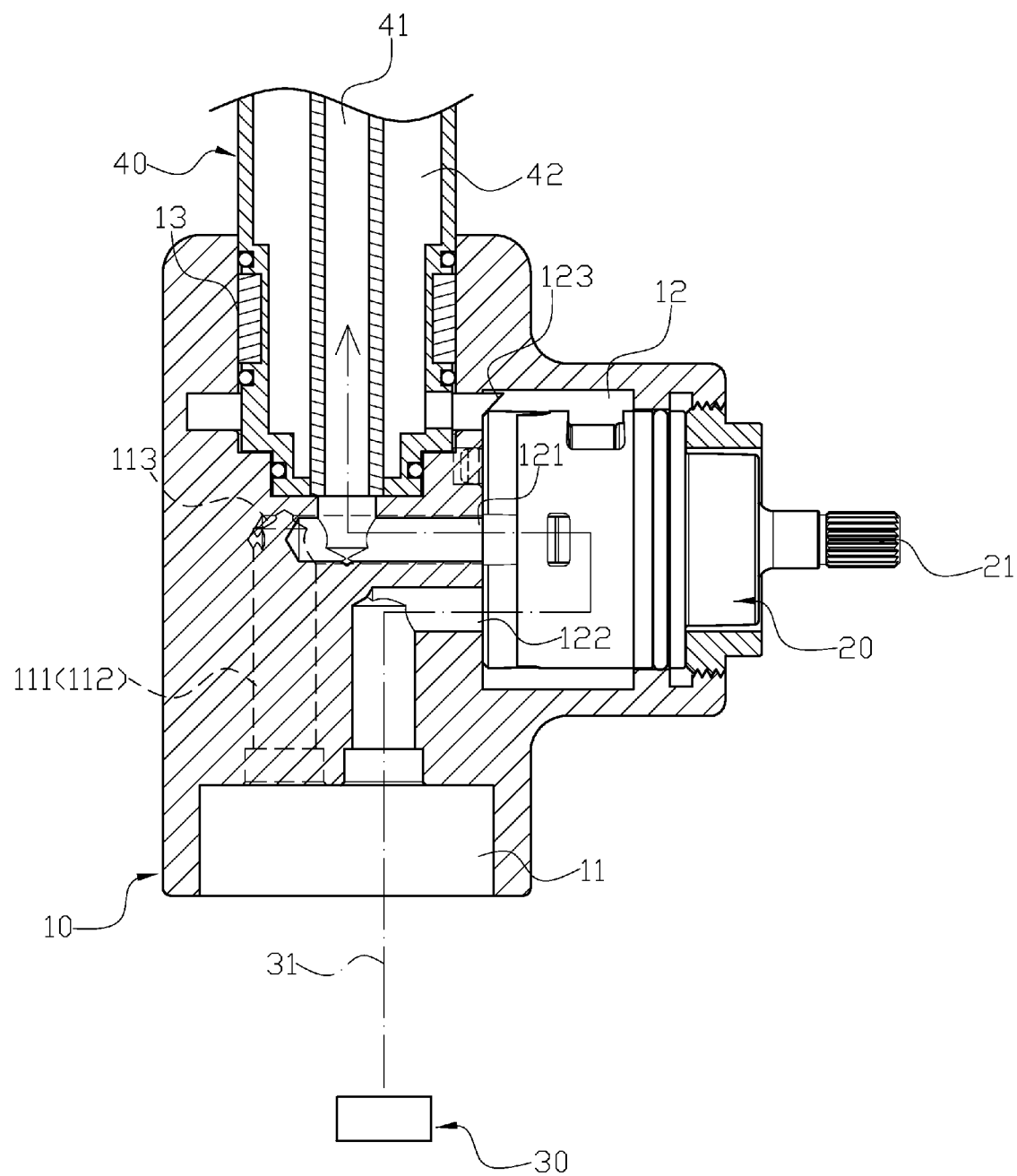
FIG. 6 is a schematic view of the faucet of the present invention providing filtered water.

Referring to FIGS. 4 to 6, in actual application, the ceramic control valve (20) is secured in the valve channel (12) of the faucet body (10), and has a control shaft bolt (21) to connect to a handle (22). By operating the handle (22), the faucet body (10) is able to provide tap water. Also, when the filtered water is conducted from the faucet body (10) into the control valve (20), the faucet is further able to control the filtered water to flow from the faucet body (10). Moreover, the faucet body (10) is able to control the mixing ratios of hot water and cold water to provide the warm water with a proper temperature. Furthermore, since the faucet body (40) comprises a filtered water conduit (31) connected between the through hole (122) and the filtered water source (30), and the water outlet tube (40) comprising an inner tube (41) and an outer tube (42) is formed inside of the water outlet chamber (13), the cold water, hot water, warm waters or filtered water is able to be selectively flowed out of the faucet through the inner tube (41) or the outer tube (42). In actual application, the faucet is able to provide tap water when the handle (22) is rotated in one direction. Cold water and hot water are able to flow from the cold water inlet tube (111) and the hot water inlet tube (112) respectively, and flow through the water conduits (113) into the ceramic control valve (20). Further, by rotating the handle (22) with different angles, the faucet is able to provide cold water, hot water, or different mixing ratios of hot water and cold water which is pre-mixed in the ceramic control valve (20). Also, since the water channel (123) is connected with the outer tube (42) of the water outlet tube (40), cold water, hot water or different ratios of warm waters are able to flow out of the faucet through the outer tube (42) (as shown in FIG. 5). On the other hand, the faucet is able to provide the filtered water by rotating the handle (22) in the other direction. By aligning or misaligning two valve pieces formed in the ceramic control valve (20), the filtered water is able to flow from the filtered water conduit (31) through the though hole (122) into ceramic control valve (20), and flows from the outlet hole on the bottom of the ceramic control valve (20) through the water outlet hole (121) and the inner tube (41) of the water outlet tube (40) out of the faucet (as shown in FIG. 6).

In one embodiment, a locating hole (124) formed at the bottom of the valve channel (12) is configured to engage with an engaging portion of the ceramic control valve (20).

In another embodiment, the water outlet hole (121) horizontally extends from the central bottom portion of the valve channel (20) to central portion of water outlet chamber (13), and upwardly penetrates a central bottom portion of the water outlet chamber (13).

In still another embodiment, the filtered water source (30) is the filtered water directly conducted from a water filter through the filtered water conduit (31) into the faucet body (10).

In a further embodiment, the filtered water source (30) is the filtered water stored in a filtered water storage container, and the filtered water is conducted from the filtered water storage container through the filtered water conduit (31) into the faucet body (10).

Comparing with conventional faucet, the present invention is advantageous because: (i) by using the faucet body (10) with the ceramic control valve (20), the present invention is able to provide the tap water and the filtered water, and further provides hot water, cold water, or different mixing ratios of warm waters without installing another ceramic control valve. Therefore, the design of the present invention simplifies the complexity in structure; (ii) it is convenient for a user to control the filtered water and the tap water with the different mixing ratios of hot water and cold water by using the faucet body (10) with a single ceramic control valve (20); and (iii) by using the long grooving-shaped water channel (123) penetrating the annular wall located at a cross section of the valve channel (12) and the water outlet chamber (13), the amounts of cold water, hot water or mixing warm waters are able to flow into the water outlet chamber (13), leading to allowing the faucet to provide plentiful multiple water sources from the outer tube (42).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A faucet for switching between multiple water sources consisting of, a water inlet chamber and a water outlet chamber formed at a bottom portion and a top portion of a faucet body respectively, a valve channel which is formed at only one lateral side of the faucet body configured to receive a ceramic control valve, wherein a top portion of the water inlet chamber has a first end of a cold water inlet tube and a first end of a hot water inlet tube to receive hot water source and cold water source respectively, and a second end of the cold water inlet tube and a second end of the hot water inlet tube are respectively connected to two first ends of water conduits with an angle, thus, the combination of the cold water inlet tube and the water conduit, and the combination of the hot water inlet tube and the water conduit are formed into L-shaped, also, both second ends of the water conduits protrude a bottom portion of the valve channel respectively, wherein a central bottom portion of the valve channel has a water outlet hole to connect to the water outlet chamber, and a through hole located beneath the water outlet hole penetrates the water inlet chamber of the faucet body, and wherein a long-grooving water channel located above the water outlet hole horizontally penetrates an annular wall of the water outlet chamber, thus, cold water, hot water or mixing water with different ratios of cold water and hot water are able to flow through the water channel into the water outlet chamber; and wherein, in actual application, the ceramic control valve is secured in the valve channel of the faucet body, and has a control shaft bolt to connect to a handle, and by operating the handle, the faucet is able to provide tap water, also, wherein when a filtered water is conducted from the faucet body into the control valve, the control valve is able to control the filtered water to flow from the faucet body, moreover, wherein the control valve is further able to control the mixing ratios of hot water and cold water to provide the warm water with a proper temperature, furthermore, wherein since the faucet body comprises a filtered water conduit connected between the through hole and a filtered water source, and a water outlet tube comprising an inner tube and an outer tube is formed inside of the water outlet chamber, the cold water, hot water, warm waters or filtered water is able to be selectively flowed out of the faucet through the inner tube or the outer tube.

2. The faucet for switching between multiple water sources of claim 1, wherein a locating hole formed at the bottom of the valve channel is configured to engage with an engaging portion of the ceramic control valve.

3. The faucet for switching between multiple water sources of claim 1, wherein the water outlet hole horizontally extends from the central bottom portion of the valve channel to a central portion of water outlet chamber, and upwardly penetrates a central bottom portion of the water outlet chamber.

4. The faucet for switching between multiple water sources of claim 1, wherein the filtered water source is the filtered water directly conducted from a water filter through the filtered water conduit into the faucet body.

5. The faucet for switching between multiple water sources of claim 1, wherein the filtered water source is the filtered water stored in a filtered water storage container, and the filtered water is conducted from the filtered water storage container through the filtered water conduit into the faucet body.

* * * * *